Nov. 22, 1938.　　W. T. JONES ET AL　　2,137,294
MANUFACTURE OF CHOCOLATE
Filed Jan. 19, 1934　　3 Sheets-Sheet 3
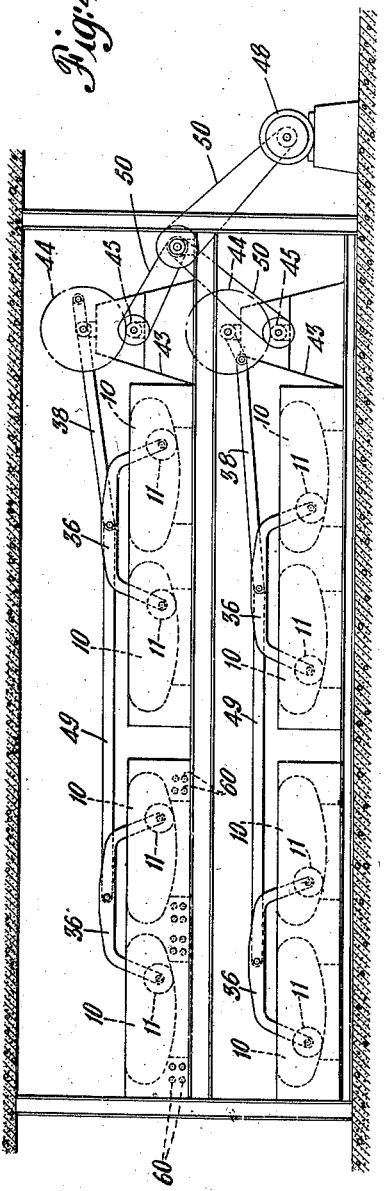
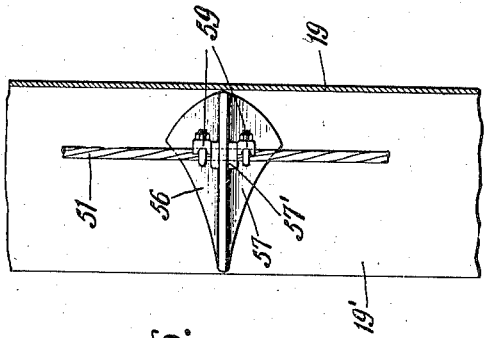
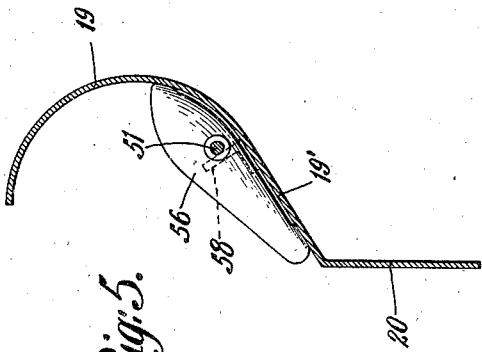
INVENTOR
WALLACE T. JONES
BY LEONARD DOTZER
ATTORNEY Patented Nov. 22, 1938

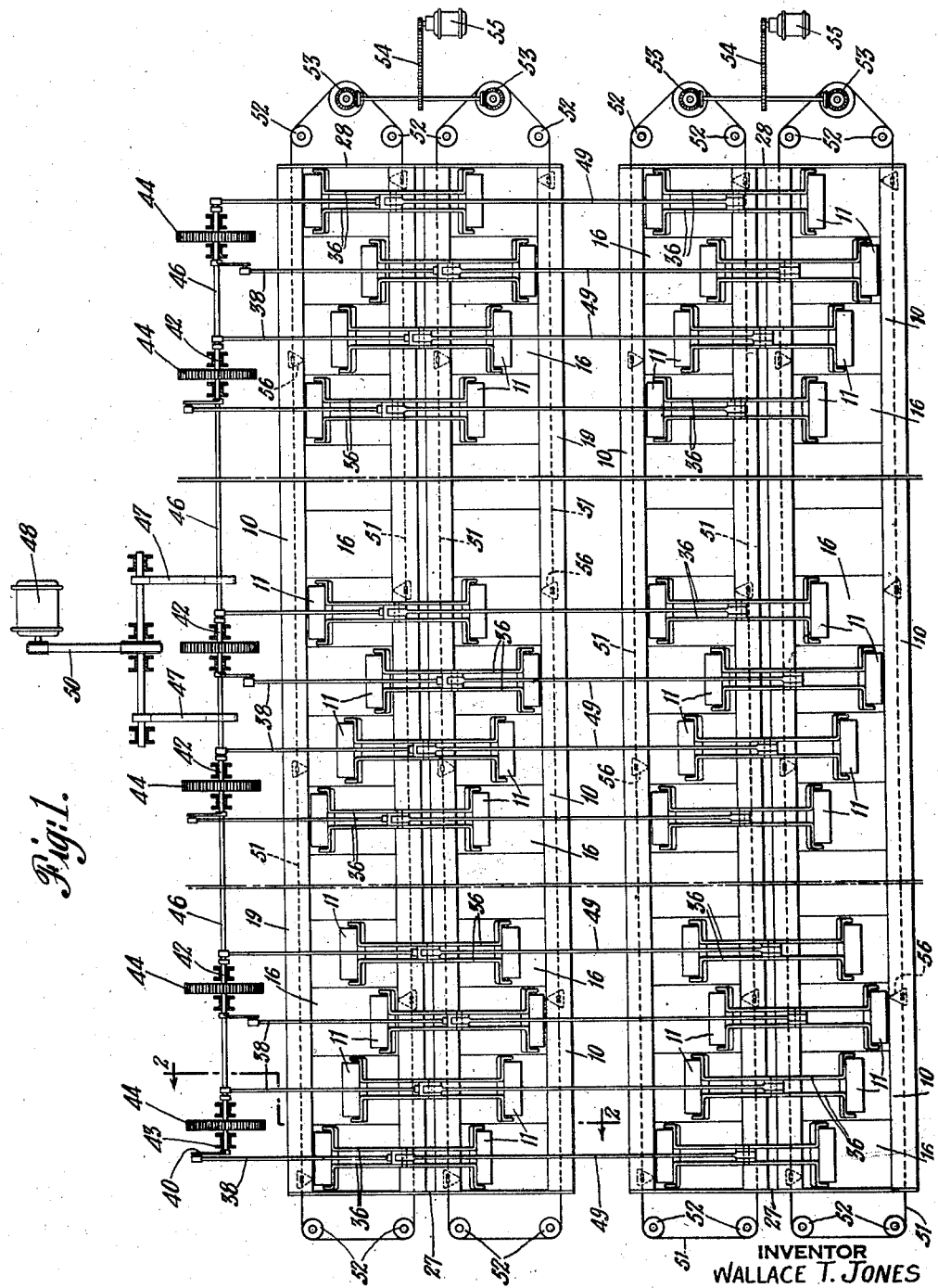

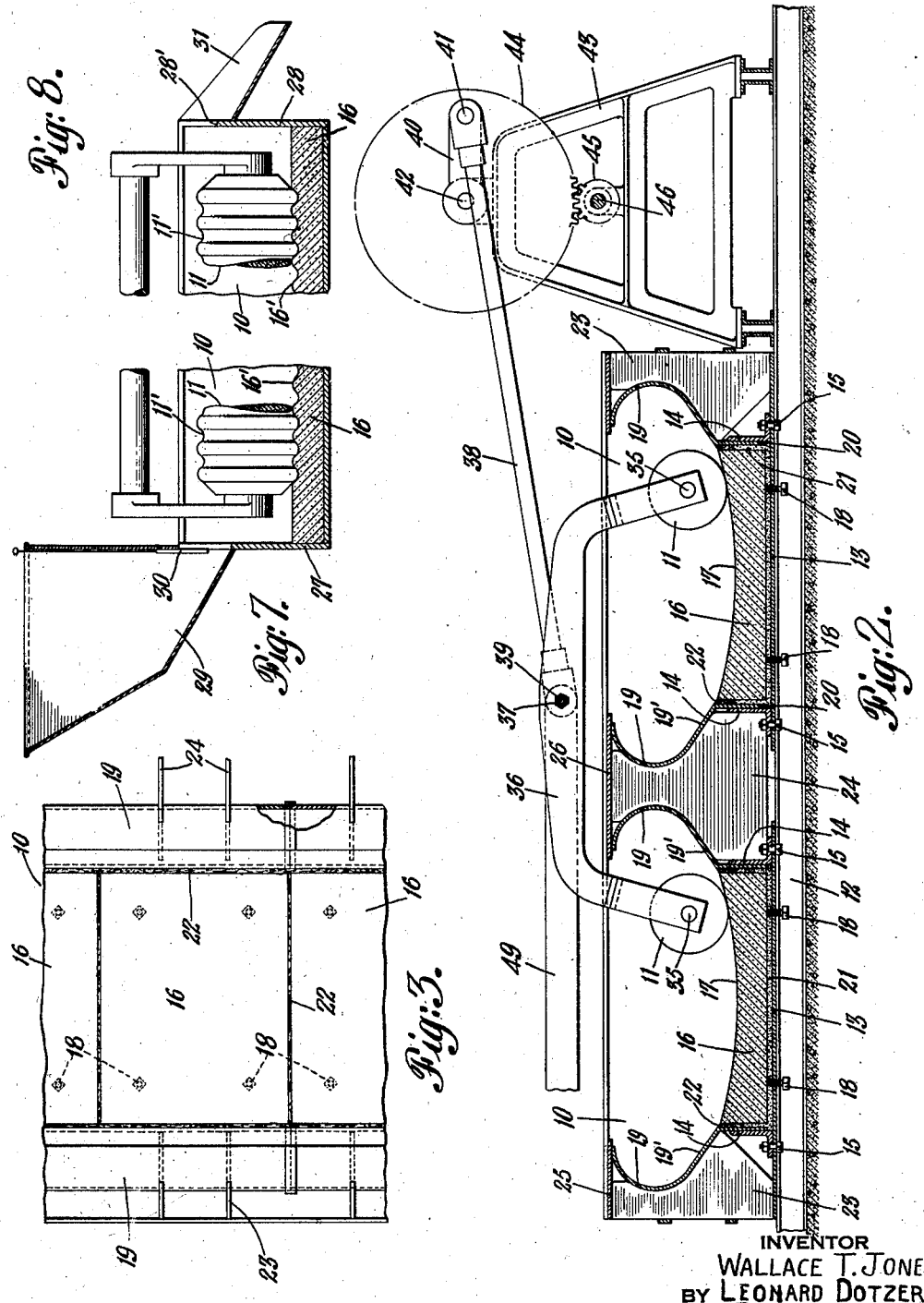

2,137,294

UNITED STATES PATENT OFFICE 2,137,294

MANUFACTURE OF CHOCOLATE

Wallace T. Jones and Leonard Dotzer, Brooklyn, N. Y., assignors to Rockwood & Co., Brooklyn, N. Y., a corporation of Delaware Application January 19, 1934, Serial No. 707,312

12 Claims. (Cl. 83—45)

This invention relates to the manufacture of chocolate and more particularly to that phase of the manufacture known as conching. In this operation, the chocolate in the form of a paste or semi-liquid is triturated or rubbed between a stone bed and a roller, commonly of granite. Just what happens to the chocolate during this operation is not entirely understood, but it is the opinion of many experts that no other satisfactory manner has been devised for producing a product which has the smoothness, mellowness and body of chocolate which has been treated in a conche of this character. Heretofore such conching action has universally been accomplished, so far as we are aware, by placing a batch of chocolate, in a rather viscous form, in the vat or tank of the conche provided with a stone bed or floor, and moving a stone roller along the floor, the chocolate having been retained in the vat under the action of the roller for extended periods of time, generally several days, or until the desired smoothness and mellowness have been produced. The chocolate has then been removed from the vat by scooping it out by hand after the operation of the roller has been discontinued. This practice is in common use at the present time, but obviously involves certain disadvantages, especially in that considerable labor is required in bailing out the main body of the viscous chocolate and in scraping off the chocolate which sticks to the floor and walls of the vat, and is difficult to remove. Moreover, the apparatus is out of operation while the chocolate is being removed. Notwithstanding these disadvantages, the batch type of apparatus has been used substantially exclusively, for a great many years, for the conching of chocolate of good quality in the manner indicated.

An object of the present invention is the provision of an improved process and apparatus which enable the conching of chocolate while it is passed along in a continuous stream, the chocolate preferably discharging itself at the desired rate. Another object is to provide such an apparatus which is capable of controlling the flow of the chocolate and at the same time insuring the thorough treatment of each portion of the mass before it leaves the machine. Still another object is to provide a process and apparatus in which the temperature of the mass can be properly controlled. A further object is to provide means, in apparatus of this character, for returning to the action of the triturating mechanism chocolate which may become lodged against the walls of the apparatus. Other objects and advantages will be pointed out or become apparent as the following detailed description of one form of machine in accordance with the invention proceeds.

In the accompanying drawings:

Fig. 1 is a plan view partially diagrammatic, of one form of apparatus constructed in accordance with our invention.

Fig. 2 is an enlarged transverse vertical section taken on the line 2—2 of Fig. 1, looking in the direction of the arrows.

Fig. 3 is a plan view, partly in section of a portion of the trough shown in Figs. 1 and 2, at one stage in its assembly.

Fig. 4 is a vertical section through a modified form of apparatus, also in accordance with the invention.

Fig. 5 is a detail view, in elevation and on enlarged scale, of one form of scraper employable in my improved apparatus.

Fig. 6 is a plan view of the scraper shown in Fig. 5.

Fig. 7 is a diagrammatic view illustrating one form of construction for feeding chocolate paste to the apparatus, and a modified form of trough and roller.

Fig. 8 is a diagrammatic view illustrating one form of construction for permitting discharge of product from apparatus.

Referring to the drawings, there is shown at 10 a trough which is considerably longer than it is wide, having a plurality of granite rollers 11 reciprocating therewithin, preferably in directions transverse to the length of the trough. The troughs may be supported on any suitable flooring or other substructure, for instance, I-beams 12 on which rigid metal sheeting 13 is carried. For positioning the troughs, angle irons 14 may extend along opposite sides of the troughs and be secured by bolts 15 to the sheeting 13 and I-beams 12. The floor or bed of the trough is preferably composed of a series of granite blocks 16 which may have their upper surfaces 17 dished or concave transversely of the machine and across which the rollers 11 travel back and forth. In building the troughs, each of the blocks 16 may be initially supported upon four levelling studs or set-screws 18 (Figs. 2 and 3), threadedly engaged with sheeting 13. The side walls of the trough are preferably formed of a series of steel plates 19 which are concave to the inside of the trough and which have extensions 20 adapted to lie against the inner faces of angle irons 14. A space may be left between the sides of the granite blocks 16 and the extensions 20, so that concrete or other suitable filling material 21 may be poured so as to surround the bottoms of the granite blocks and form, on hardening, a firm base for the blocks. A non-porous filler may be employed as shown at 22 to provide a tight joint between the granite blocks and the lower edges of walls 19. The lower portions 19' of the walls 19 may advantageously slope at an angle such as that indicated to aid in returning to the granite beds chocolate pushed off the same by the operation of the rollers 11.

Furthermore, this construction of the side walls aids in producing a better and more thorough circulation and mixing of the chocolate by promoting a wave effect when a roller throws a portion of the chocolate against the walls at the end of its stroke, so that some of the chocolate breaks back over the main body of the chocolate and toward the center of the trough.

For strengthening the walls 19, spaced, transversely-extending, metal plates 23 and 24 may be provided suitably secured in place as by welding to the walls 19, members 13 and longitudinal top members 25 and 26 at opposite sides of the troughs. The end of the trough at which material is admitted may be closed by an end plate 27 and the outlet end may be closed by an end plate 28, for instance, as shown in Figs. 7 and 8. A hopper 29 having a gate valve 30 or other suitable control mechanism may be employed for controlling the flow of raw material into the trough, and a chute 31 may be provided for carrying off the rubbed product as it is discharged. The top of the wall or end plate 27 is preferably above the level of the paste in the trough while the end wall 28 may have that portion of its upper edge 28' which lies directly in back of chute 31 arranged to act as a weir. However, the construction of the inlet and outlet means may be varied within the spirit of the invention as may the other structural details. It is desirable that the floor of the trough be generally horizontal lengthwise of the machine.

It is desirable that the rollers 11 travel back and forth over substantially the full width of the granite blocks 16. For reciprocating the rollers, any convenient mechanism may be employed. For example, pairs of rollers in adjacent troughs 18 may have their axles 35 pivoted between the ends of yokes 36, which latter are joined at their mid-points by bolts 37. Links 38 may be pivoted to the bolts 37 as shown at 39 and to crank arms 40 as shown at 41. Adjacent rollers in each trough may be similarly connected to crank arms which are at angles of 90° to one another and secured to a shaft 42 which is supported on suitable stationary frames 43. The successive crank arms and rollers may be suitably staggered in order to provide for maintaining the power supplied substantially constant, and avoid heavy peaks which would result if all the rollers reached the ends of their strokes (where they are required to do the most work) at the same time. Such an arrangement can be formulated according to recognized principles of mechanics. Splined on shaft 42 or otherwise secured for rotation therewith are gears 44 which may be driven from pinion gears 45, driven in turn through shaft 46, reduction gearing 47 and electric motor 48. Where the construction is counterbalanced, as shown, all the rollers 11 may be driven from a single source of power, with the additional advantage that the relative positions of the rollers are maintained and their movements are correlated to good advantage. Where the rollers are staggered ample space is provided into which chocolate may flow at the sides of each roller as it reaches the end of its travel. However, other arrangements may be employed, if desired, in which the relative movements of the rollers are otherwise correlated.

If a double row, each row consisting of a pair of troughs is desired, the second row of rollers may be driven from the first row by means of suitable links 49 pivoted to bolts 37, as shown more or less diagrammatically in Fig. 1 and in more detail in Fig. 2. However, the number and arrangement of the troughs and the construction of the driving mechanism for the rollers may be varied, in accordance with mechanical practice. For instance, in Fig. 4 there is shown a two-tier machine in which gears 44, 45 of both tiers are illustrated as driven by chains 50 from a single motor 48.

In carrying out the treatment of chocolate paste or the like in accordance with the invention, the chocolate to be treated may be fed into the machine through hopper 29 and its rate of flow controlled by gate 30. The roller operating mechanism having been started, the entering chocolate is worked by the roller nearest the inlet end of the machine. After the trough has been filled to the desired level with chocolate, and after the portions nearest the outlet end have been sufficiently conched, chocolate will be fed into the inlet end of the machine at the rate at which it is desired to discharge the product while allowing sufficient time for all the chocolate to be thoroughly triturated or conched. The material will thus advance along the trough at the desired rate, probably due to the differential hydraulic head produced. In other words, as the chocolate is fed in and worked by the rollers the level of the chocolate rises until the whole trough is filled up to height of the top of weir 28' and the product is discharged down chute 31 at a rate corresponding to the rate of inflow from hopper 29. The height of the top 28' of the weir is preferably adjustable in order that the level of chocolate to be maintained in the trough may be varied as desired, this level being advantageously below the tops of the rollers, and preferably, though not necessarily, not too high to prevent the rollers from throwing the chocolate against the walls 19 so as to break up along the upper portions of these walls like waves, as mentioned above. In place of a weir, other suitable discharge control mechanism may be employed, if desired, such as a conduit having a valve to regulate the rate of discharge in accordance with the rate of feed and other considerations mentioned.

In general, it is desirable that the chocolate be worked by the rollers for, say, 24 to 72 hours, more or less, and if it be found that the chocolate paste discharged is insufficiently treated, the inflow of chocolate may be stopped while the apparatus works for a time on the mass in the trough. In fact, it may be desirable to fill the trough with an initial charge and then operate the rollers until this charge is sufficiently treated, when the feed may be started, and the discharge of product automatically effected. However, the process is particularly advantageous when the inflow and outflow are continuous, after the initial stages, so that each increment of chocolate receives the same treatment and a product of uniform quality is produced.

The operation of the rollers in directions generally transverse to the flow of material acted upon is of particular advantage in securing a thorough trituration or rubbing of the chocolate while not tending to advance the chocolate faster than it can be practically and thoroughly worked while passing through the apparatus. The length of the apparatus and the number of rollers will depend to a considerable extent upon the speed at which the chocolate passes through the machine, but by way of example, one form of machine may include about twenty-eight rollers some twenty-two inches long, more or less. The linear speed of travel of the rollers across the trough may be adjusted in accordance with the considerations mentioned and within limits, as will be understood by those skilled in the art. In such a machine a given increment of chocolate may take about 48 to 144 hours to pass through the machine. The time may vary depending on the character of the materials acted upon and the quality of the product required.

Should it be desirable to impede the advance of chocolate along the trough, in order to insure a more thorough mixing and conching by each roller, it may be of advantage to interpose upright, transverse baffles between certain or all of the rollers. Such baffles may be of greater height adjacent the side walls of the trough than at their mid-sections in order that the chocolate which is thrown against a side wall of the trough, when a given roller reaches the end of its travel, will not flow directly into the space opposite a roller or rollers next to the roller in question, but only a portion of the chocolate in each compartment thus formed will pass over the center portion of the baffle. Such baffles, while they should not be such as to prevent all flow of chocolate in accordance with the present process, if employed, may take various shapes.

If shorter troughs are desired on account of space limitations, then the troughs may be arranged, for instance, as shown in Fig. 4, provision being made for delivering the output from one end of one trough into the adjacent inlet end of the trough directly below. Other variations in the arrangement of the troughs may also be advised by practical requirements.

When the rollers 11 urge a pasty mass of chocolate into the concave portions of walls 19, there may be a tendency for at least portions of the mass to stick to these walls. When such material is to be treated in my apparatus, some sort of scraper may advantageously be employed to return the chocolate to the action of the rollers. One form of scraper mechanism well suited for this purpose may comprise a wire or cable 51 extending along the sides of the trough and running through the ends thereof as shown in Fig. 1. Suitable pulleys 52 may be provided over which the cable 51 runs, being driven through any suitable mechanism 53, gearing 54 and reversible motor 55. Any convenient number of scrapers 56 or 57 as shown in Figs. 5 and 6, may be secured to the cable 51, for instance, by means of flanges 57' and suitable clamps 59, respectively. The shapes of the scraper blades may vary but the plow-shaped form shown is satisfactory. Their outer surfaces, however, are preferably smooth and slope outwardly toward the bases of the scrapers. The action of such scrapers is good and there are no pockets in which the chocolate can collect. They advantageously have their lower surfaces in abutment with the surfaces 19' and may scrape the walls 19 to any desired height. In operation, the motor 53 automatically reverses from time to time thus causing the scrapers to move back and forth lengthwise of the trough. The travel of the blades depends on the number employed. Where desired, angle irons 58 may be employed for supporting the cable at the desired height.

As best shown in Figs. 7 and 8, the rollers 11 are preferably provided with rounded circumferential corrugations 11' while the beds 16 have cooperating corrugations 16' extending across the trough. A feature of the machine resides in only corrugating the portions of the beds which are directly beneath the rollers, the portions of the beds between the successive rollers being flat. In this way, the flow of chocolate is not impeded and there is no tendency for the chocolate to stick in portions of the beds over which the rollers do not travel. While such corrugations appear to be of particular advantage in a machine of present character, as aiding in particularly good working and control of the flow of material, the invention in its broader aspects is not limited to the employment of such corrugations as plain rollers and beds might be employed.

It will be understood that it is desirable to maintain the temperature of the chocolate at a proper range during the process and cause evaporation of moisture from the chocolate, and this may be accomplished by substantially closing the trough with suitable covers and blowing a stream of preheated, dry air at a suitable temperature, up to, say, 200° F. or more, into the chamber thus formed and over the top of the chocolate, the air preferably entering at the chocolate outlet end of the machine. The heating of the mass under treatment may be supplemented, if desired, by means of steam coils 60 (as shown in Fig. 4) or other suitable heating elements around the troughs in which the mass is retained. It is often desirable in order to promote a certain caramelization of the chocolate to heat the same over a carefully controlled period of time and at carefully controlled temperatures, for instance, by gradually raising the temperature of the chocolate for thirty to forty-five minutes to about 239° F. to 248° F., and then cooling it slowly and gradually to a lower temperature. As will be understood by those skilled in the art, care must be taken to avoid burning the chocolate if it should contact with overheated iron surfaces. The present process and apparatus appear to be particularly adapted to the carrying out of such heating of the material in the troughs because the material is continuously advancing and may be passed through a heated stage and into a cooling stage. For instance, heating elements may be provided under one or two rollers toward the outlet end of the machine and the chocolate then passed out into suitable receptacles for receiving the product and allowing the same to cool.

While the present invention has been developed and is primarily concerned with the processing of chocolate in paste form, it may be used in connection with other similar materials. Accordingly, the scope of the invention is not to be restricted to use with this one particular material.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

We claim:

1. In apparatus of the character described, for triturating chocolate paste, a long, narrow trough, a plurality of rollers adapted to rest on the bottom of the trough in end-to-end relation, means to reciprocate the rollers crosswise of the trough, means to admit a stream of paste to one end of the trough, and means to permit continuous outlet of triturated paste at the other end.

2. In apparatus of the character described, for triturating chocolate paste, a trough, a plurality of rollers adapted to rest on the paths of the trough in end-to-end relation, means to reciprocate the rollers crosswise of the trough, said rollers being in staggered relation, means to admit a stream of paste to one end of the trough, and means to permit continuous outlet of triturated paste at the other end.

3. In apparatus of the character described, for triturating chocolate paste, a trough, a plurality of rollers adapted to rest on the bottom of the trough in end-to-end relation, means to reciprocate the rollers crosswise of the trough, means to admit a stream of paste to one end of the trough, and means to permit continuous outlet of triturated paste at the other end, said last-named means comprising a weir.

4. In apparatus of the character described, for conching viscous chocolate paste, a long, narrow trough having a stone bed, a plurality of stone rollers adapted to rest on the bed, in end-to-end relation to one another, means to reciprocate the rollers crosswise of the trough, means to admit chocolate to the trough at one end thereof, and means to permit continuous discharge of conched product at the other end of the trough.

5. Process of conching chocolate paste which comprises continuously feeding the same into one end of a trough, moving a roller across the bottom of the trough during the feeding, and discharging the product from a portion of the trough remote from said end by fluid head of paste while conching of other portions of the paste is continuing.

6. In apparatus of the character described, for triturating chocolate paste, a trough, a plurality of rollers adapted to rest on the bottom of the trough in end-to-end relation, means for reciprocating said rollers crosswise of said trough said rollers having circumferential corrugations and said trough having cooperating corrugations beneath the rollers, and flat surfaces intermediate the rollers.

7. In apparatus of the character described, a long trough having side walls which are concave on their inner sides, rollers in the trough, means to reciprocate the rollers cross-wise of the trough, means to feed viscous chocolate or the like in at one end of the trough, means to withdraw the product at the other end of the trough, and scrapers reciprocatable lengthwise of the trough and cooperating with the concave portions of said walls.

8. The process of conching chocolate paste which comprises feeding paste into one end of a trough, subjecting the paste to the action of a series of reciprocable rollers in said trough and concurrently causing portions of said paste to flow in a direction at right angles to the paths of said rollers toward the opposite end of said trough, and discharging conched paste from said opposite end of the trough while conching of the paste within the trough is continuing.

9. The process of conching chocolate paste which comprises feeding paste into one end of a trough, flowing said paste toward the opposite end of said trough while concurrently subjecting the paste to pressure applied transversely to the direction of flow thereof, and discharging conched paste from said opposite end of the trough while conching of the paste within the trough is continuing.

10. The process of conching chocolate paste which comprises flowing the paste longitudinally along a trough while concurrently subjecting it to the pressure of rollers reciprocating across the trough, discharging conched paste from one end of the trough while conching of the paste within the trough is continuing, and continuously feeding paste into the other end of the trough at a rate corresponding to the rate of discharge.

11. The process of conching chocolate paste which comprises flowing paste longitudinally along a trough while subjecting said paste to the action of rollers applied transversely to the path of flow, feeding paste to an inlet portion of said trough on one side of said rollers, and discharging conched product from an outlet remote from said inlet and on the other side of said rollers at a rate corresponding with the fluid head of material adjacent said outlet.

12. A method of continuously conching chocolate paste comprising slowly feeding the ingredients of said paste into a trough, moving said paste along said trough under the action of the fluid head thereof while subjecting the paste to the action of reciprocating conching elements, and discharging conched paste from said trough at a point remote from said feeding and at a rate in accordance with the rate of said feeding.

WALLACE T. JONES.
LEONARD DOTZER.